(12) United States Patent
Han (10) Patent No.: US 10,306,940 B2
(45) Date of Patent: Jun. 4, 2019

(54) METHOD FOR PRODUCING OUTDOOR CLOTHING NOT REQUIRING SEAM TAPE AND HAVING STRENGTHENED WATERPROOF FUNCTION

(71) Applicant: Kee Soo Han, Seoul (KR)

(72) Inventor: Kee Soo Han, Seoul (KR)

(73) Assignee: INTERMAX CO., LTD., Seoul (KR)

(*) Notice: Subject to any disclaimer, the term of this patent is extended or adjusted under 35 U.S.C. 154(b) by 0 days.

(21) Appl. No.: 15/577,532

(22) PCT Filed: Jun. 1, 2016

(86) PCT No.: PCT/KR2016/005821
§ 371 (c)(1),
(2) Date: Nov. 28, 2017

(87) PCT Pub. No.: WO2017/188502
PCT Pub. Date: Nov. 2, 2017

(65) Prior Publication Data
US 2019/0037945 A1    Feb. 7, 2019

(30) Foreign Application Priority Data

Apr. 25, 2016  (KR) .................. 10-2016-0050111

(51) Int. Cl.
*B32B 37/00*  (2006.01)
*A41D 27/24*  (2006.01)
(Continued)

(52) U.S. Cl.
CPC .......... *A41D 27/245* (2013.01); *A41D 13/00* (2013.01); *A62B 17/006* (2013.01); *B32B 3/06* (2013.01);
(Continued)

(58) Field of Classification Search
CPC .... A41D 27/245; A41D 13/00; A62B 17/006; B32B 3/06; B32B 5/02; B32B 5/26;
(Continued)

(56) References Cited

U.S. PATENT DOCUMENTS 6,171,431 B1 * 1/2001 Gallagher, Jr. ...... A41D 27/245
156/251
6,694,528 B1 * 2/2004 Chang .................. B29C 66/71
112/418
(Continued)

FOREIGN PATENT DOCUMENTS

JP    2008539337    11/2008
KR    101172928    8/2012
(Continued)

OTHER PUBLICATIONS

International Search Report—PCT/KR2016/005821 dated Feb. 13, 2017.

*Primary Examiner* — James D Sells
(74) *Attorney, Agent, or Firm* — Cantor Colburn LLP (57) ABSTRACT

Provided is a method of manufacturing outdoor clothing requiring no seam tape and having an enhanced waterproof function in which a waterproof function is further improved. The method includes: preparing an outer fabric in which surface contact portions of a first outer fabric and a second outer fabric are bonded to a bottom surface of the first outer fabric; preparing a structure in which a first adhesive layer, a membrane, and a second adhesive layer are sequentially disposed on an upper surface of the inner fabric; and bonding the structure and the outer fabric.

16 Claims, 3 Drawing Sheets

(51) Int. Cl.
  *B32B 5/26* (2006.01)
  *B32B 5/02* (2006.01)
  *B32B 3/06* (2006.01)
  *B32B 9/00* (2006.01)
  *B32B 9/04* (2006.01)
  *B32B 37/02* (2006.01)
  *B32B 37/18* (2006.01)
  *A62B 17/00* (2006.01)
  *A41D 13/00* (2006.01)

(52) U.S. Cl.
  CPC .............. *B32B 5/02* (2013.01); *B32B 5/26* (2013.01); *B32B 9/007* (2013.01); *B32B 9/047* (2013.01); *B32B 37/02* (2013.01); *B32B 37/182* (2013.01); *A41D 2300/52* (2013.01); *A41D 2400/34* (2013.01); *B32B 2307/7145* (2013.01); *B32B 2307/7242* (2013.01); *B32B 2307/7265* (2013.01); *B32B 2313/04* (2013.01); *B32B 2437/00* (2013.01); *B32B 2571/00* (2013.01)

(58) Field of Classification Search
  CPC ......... B32B 9/007; B32B 9/047; B32B 37/02; B32B 37/182
  USPC .......................................... 156/73.1
  See application file for complete search history.

(56) References Cited

U.S. PATENT DOCUMENTS

| | | | |
|---|---|---|---|
| 7,005,021 B2* | 2/2006 | Kramer | A41D 27/245 156/157 |
| 7,455,743 B2* | 11/2008 | Kramer | A41D 27/245 156/157 |
| 2009/0222980 A1 | 9/2009 | Klug et al. | |

FOREIGN PATENT DOCUMENTS

| | | |
|---|---|---|
| KR | 101407515 | 6/2014 |
| KR | 101597176 | 2/2016 |
| KR | 101602627 | 3/2016 |
| WO | 2011091351 | 7/2011 |
| WO | 2015057176 | 4/2015 |

* cited by examiner

FIG. 1

*PRIOR ART*

METHOD FOR PRODUCING OUTDOOR CLOTHING NOT REQUIRING SEAM TAPE AND HAVING STRENGTHENED WATERPROOF FUNCTION

TECHNICAL FIELD

The present invention relates to a method of manufacturing outdoor clothing requiring no seam tape (seamless) and having an enhanced waterproof function, and more particularly, to an improved method of manufacturing outdoor clothing requiring no seam tape and having an enhanced waterproof function, which is applied to manufacturing clothes, bags, shoes, a tent, and the like to provide an improved waterproof function.

BACKGROUND ART

In manufacturing a waterproof product, a seam structure plays an important role.

International Publication No. WO2011/091351 discloses a waterproof seam. A hydrophobic polymer membrane is provided into a seam by an application of a seam tape to provide a long seam.

However, a structure of the seam is rather complex. Further, the disclosed waterproof seam starts with laminated fabric requiring continuous stitching. Accordingly, in order to seal needle holes generated during the stitching, the seam disclosed in the related art requires a use of a seam tape. The use of the seam tape requires additional cost and labor. Accordingly, there is a demand for an alternative waterproof seam.

Figure 1:
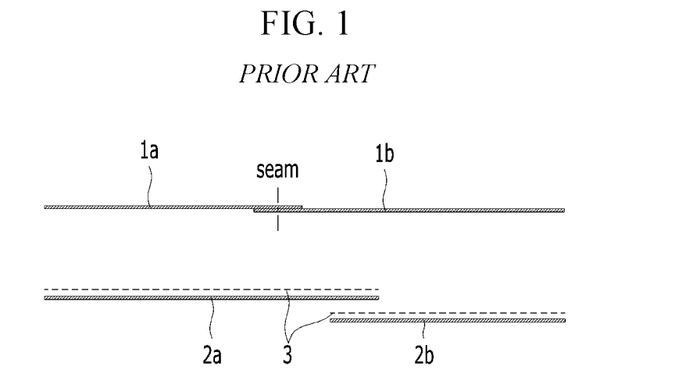
FIG. 1 is a diagram illustrating an example of a structure of waterproof fabric in the related art.

FIG. 1 illustrates a fabric structure which does not use a seam tape in the related art. In FIG. 1, a first outer fabric 1a and a second outer fabric 1b are cut according to a pattern of an item to be generated, and then the first outer fabric 1a and the second outer fabric 1b are bonded by stacking one side of the first outer fabric 1a on one side of the second outer fabric 1b and stitching a joint portion of the first outer fabric 1a and the second outer fabric 1b. This is referred to as a seam.

Further, a first inner fabric 2a and a second inner fabric 2b are cut according to the pattern of the item to be generated, and one side of the first inner fabric 2a is stacked on one side of the second inner fabric 2b after forming an adhesive layer 3 on each of the inner fabrics 2a and 2b.

Further, the first outer fabric 1a and the second outer fabric 1b are bonded on the stacked first inner fabric 2a and second inner fabric 2b.

The fabric structure in the related art of FIG. 1 has an effect in that a seam tape is not used.

However, the first inner fabric 2a and the second inner fabric 2b overlap, so that the completed fabric is thick. Further, rainwater and the like may permeate through the bonded portion of the first outer fabric 1a and the second outer fabric 1b and pass between the first inner fabric 2a and the second inner fabric 2b.

Further, in the structure of the related art, the bonded portion may be easily separated during a cleaning process or wearing.

RELATED ART LITERATURE (Patent Document 1) Related Art 1: WO 2015/057176 (Multi-Layer Waterproof Seam)

(Patent Document 2) Related Art 2: WO 2011/091351 (Waterproof Garment with Invisible Barrier Seam)

DISCLOSURE

Technical Problem

The present invention has been made in an effort to solve the aforementioned problems, and an object of the present invention is to provide a method of manufacturing outdoor clothing requiring no seam tape and having an enhanced waterproof function, which has a further improved waterproof function.

Technical Solution

In order to achieve the foregoing objects, a method of manufacturing outdoor clothing requiring no seam tape and having an enhanced waterproof function according to an exemplary embodiment of the present invention includes: preparing a first structure in which a first outer fabric and a second outer fabric are bonded to each other by ultrasonic welding and a second structure in which a first inner shell and a second inner shell are bonded to each other by ultrasonic welding; and bonding the first structure and the second structure.

Advantageous Effects

According to the present invention including the foregoing configuration, even though water permeates, a bonded portion in the first structure and a bonded portion in the second structure are not positioned in the same vertical line, so that there is an effect in improving strength and the clothing is thinner than outdoor clothing in the related art.

In the meantime, the adhesive is positioned on the opposite surface corresponding to the surface contact portion of the first outer fabric which is in surface contact with the surface contact portion of the second outer fabric, the inner portions of the surface contact portion of the first outer fabric and the surface contact portion of the second outer fabric which are in surface contact with each other are stitched, and the surface contact portions which face each other are folded toward and attached to the first outer fabric to finally complete the outer fabric configured with the first outer fabric and the second outer fabric, and the second adhesive layer is formed between the stitched outer fabric and the membrane and the adhesive and the second adhesive layer close needle holes of the outer fabric formed by the stitching, thereby preventing outside water from permeating through the outer fabric, and further, the membrane having a waterproof function is disposed, thereby preventing outside water or moisture from further permeating even though outside water or moisture permeates through the outer fabric.

Further, it is possible to prevent the bonded portion from being separated during a cleaning process or wearing.

Further, the present invention may be used as reversible outdoor clothing, and add an aesthetic sense.

In the present invention, the inner fabric and the outer fabric are bonded to serve as a seam tape, so that a seam tape is not required.

BEST MODE

In order to achieve the foregoing objects, a method of manufacturing outdoor clothing requiring no seam tape and having an enhanced waterproof function according to an exemplary embodiment of the present invention includes: preparing a first structure in which a first outer fabric and a second outer fabric are bonded to each other by ultrasonic welding and a second structure in which a first inner fabric and a second inner fabric are bonded to each other by ultrasonic welding; and bonding the first structure and the second structure.

In the preparing, the first structure in which a cross section of one side of the first outer fabric is in contact with a cross section of one side of the second outer fabric without overlapping and the first outer fabric and the second outer fabric are bonded by the ultrasonic welding may be prepared.

In the preparing, the second structure in which a membrane is disposed on an upper surface of the first inner fabric and an adhesive layer is formed on an upper surface of the membrane, a membrane is disposed on an upper surface of the second inner fabric and an adhesive layer is formed on an upper surface of the membrane, and then a cross section of one side of the first inner fabric is made to be in contact with a cross section of one side of the second inner fabric without overlapping and the first inner fabric and the second inner fabric are bonded by the ultrasonic welding may be prepared.

In the preparing, a bonded portion in the first structure and a bonded portion in the second structure may be disposed at different positions.

A material of the first outer fabric and the second outer fabric, and the first inner fabric and the second inner fabric may be one or more of polyester, polyamide, polyvinylchloride, polyketone, polysulfone, polycarbonate, fluoropolymer, polyacrylate, polyurethane, and polypropylene.

The membrane includes one or more of microporous polytetrafluoroethylene, nanoporous polytetrafluoroethylene, expanded PTFE, polyurethane, cross-linked polyurethane, polypropylene, and polyester.

The membrane includes one of activated carbon particles, graphene, and carbon nanotube (CNT).

The membrane may have resistive force to one or more of pathogenic microorganisms, blood borne pathogen, viruses, bacteria, liquid chemical agents, and gaseous chemical agents.

The adhesive layer may be a layer onto which any one of a powder adhesive, a web adhesive, a micro dot adhesive, and a nano dot adhesive is applied.

The bonding may include disposing the first structure on an upper surface of the second structure, fusing the first structure and the second structure, and then cold pressing the first structure and the second structure.

A fusing temperature of the first structure and the second structure may be about 100 to 200° C., a pressure may be 0.1 to 1 MPa, and a time may be 10 seconds to 1 minute.

A cold pressing temperature of the first structure and the second structure may be room temperature, a pressure may be 0.1 to 1 MPa, and a time may be 3 seconds to 10 seconds.

The cold pressing process may be a hard-set process and a curing process.

The first structure and the second structure may be pre-fused in a state where the first structure is temporarily disposed on the second structure before the fusing.

The pre-fusing may be a soft set process, and may perform only a bonding function without curing.

A method of manufacturing outdoor clothing requiring no seam tape and having an enhanced waterproof function according to another exemplary embodiment of the present invention includes: preparing an outer fabric in which surface contact portions of a first outer fabric and a second outer fabric are bonded to a bottom surface of the first outer fabric; preparing a structure in which a first adhesive layer, a membrane, and a second adhesive layer are sequentially disposed on an upper surface of an inner fabric; and bonding the structure and the outer fabric, in which in the preparing of the outer fabric, an adhesive is positioned on an opposite surface corresponding to the surface contact portion of the first outer fabric which is in surface contact with the surface contact portion of the second outer fabric, ends of the inner sides of the surface contact portion of the first outer fabric and the surface contact portion of the second outer fabric which are in surface contact with each other are stitched, and the surface contact portions which face each other are folded and attached to a bottom surface of the first outer fabric.

A material of the first outer fabric, the second outer fabric, and the inner fabric may be one or more of polyester, polyamide, polyvinylchloride, polyketone, polysulfone, polycarbonate, fluoropolymer, polyacrylate, and polyurethane, polypropylene.

The first adhesive layer and the second adhesive layer may be layers onto which any one of a powder adhesive, a web adhesive, a micro dot adhesive, and a nano dot adhesive is applied.

The bonding may include disposing the outer fabric on an upper surface of the inner fabric, fusing the inner fabric and the outer fabric, and then cold pressing the inner fabric and the outer fabric.

A fusing temperature of the inner fabric and the outer fabric may be about 100 to 200° C., a pressure may be 0.1 to 1 MPa, and a time may be 10 seconds to 1 minute.

A cold pressing temperature of the inner fabric and the outer fabric may be room temperature, a pressure may be 0.1 to 1 MPa, and a time may be 3 seconds to 10 seconds.

The cold pressing process may be a hard-set process and a curing process.

The outer fabric and the inner fabric may be pre-fused in a state where the outer fabric is temporarily disposed on the inner fabric before the fusing.

The pre-fusing may be a soft set process, and may perform only a bonding function without curing.

Mode for Carrying Out the Invention

The present invention may have various modifications and exemplary embodiments and thus specific exemplary embodiments will be illustrated in the drawings and described in detail.

However, it is not intended to limit the present invention to the specific exemplary embodiments, and it will be appreciated that the present invention includes all modifications, equivalences, or substitutions included in the spirit and the technical scope of the present invention.

Terms used in the present application are used only to describe specific exemplary embodiments, and are not intended to limit the present invention.

Singular expressions used herein include plurals expressions unless they have definitely opposite meanings in the context. In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

All terms used herein including technical or scientific terms have the same meanings as meanings which are generally understood by those skilled in the art unless they are differently defined. It shall be construed that terms defined in a generally used dictionary have meanings matching those in the context of a related art, and the terms shall not be construed in ideal or excessively formal meanings unless they are clearly defined in the present application.

Hereinafter, an exemplary embodiment of the present invention will be described in more detail with reference to the accompanying drawings. In describing the present invention, in order to make the present invention to be easily understood, the same element in the drawing will be designated by the same reference numeral, and an overlapping description of the same constituent element will be omitted.

Figure 2:
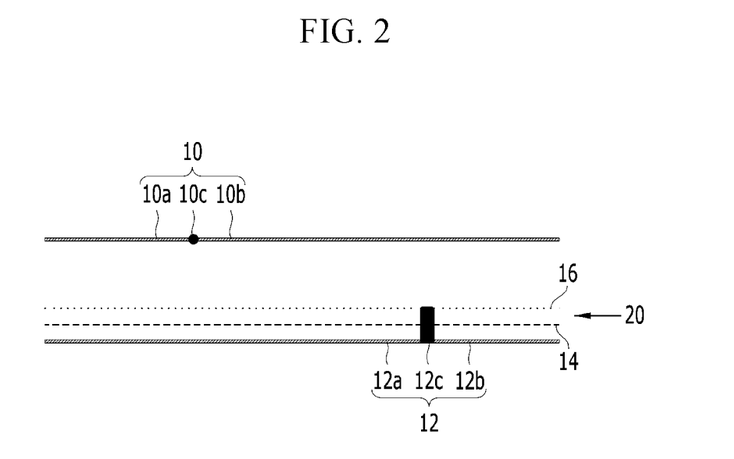
FIG. 2 is a diagram illustrating a structure of outdoor clothing according to a first exemplary embodiment of the present invention.

FIG. 2 is a diagram illustrating a structure of outdoor clothing according to a first exemplary embodiment of the present invention.

Waterproof fabric according to the first exemplary embodiment of the present invention includes a first structure 10, a second structure 20, a membrane 14, and an adhesive layer 16.

The first structure 10 is a structure in which a first outer fabric 10a and a second outer fabric 10b are bonded to each other by ultrasonic welding. In this case, the first outer fabric 10a is cut according to a pattern of an item which is to be generated and the second outer fabric 10b is cut according to a pattern of an item which is to be generated, a cross section of one side of the first outer fabric 10a and a cross section of one side of the second outer fabric 10b are made to be in contact with each other without overlapping and a portion 10c in which the cross section of one side of the first outer fabric 10a is in contact with the cross section of one side of the second outer fabric 10b is bonded by ultrasonic welding.

In the meantime, the ultrasonic welding process is not limited to the foregoing process, and an ultrasonic welded fabric may be completed by overlapping the first outer fabric 10a and the second outer fabric 10b each other, bonding the first outer fabric 10a and the second outer fabric 10b by performing generally well-known ultrasonic welding on a slightly inner side (about 2 to 3 mm, but is not limited thereto) of the cross section of one side along the cross section of one side by an ultrasonic welding device (not illustrated), simultaneously cutting protruding portions by a cutter, and then making a surface of the cut portion head in a down direction.

A material of the first outer fabric 10a and the second outer fabric 10b may be one or more of polyester, polyamide, polyvinylchloride, polyketone, polysulfone, polycarbonate, fluoropolymer, polyacrylate, polyurethane, co-polyetherester, polypropylene, and co-polyetheramide.

An inner fabric 12 of the second structure 20 is a structure in which a first inner fabric 12a and a second inner fabric 12b are bonded to each other by ultrasonic welding. More particularly, an inner fabric 12 is completed by disposing the membrane 14 on an upper surface of the first inner fabric 12a which is cut according to the pattern of the to-be-generated item and forming the adhesive layer 16 on an upper surface of the membrane 14, disposing the membrane 14 on an upper surface of the second inner fabric 12b which is cut according to the pattern of the to-be-generated item and forming the adhesive layer 16 on the upper surface of the membrane 14, and then bonding a cross section of one side of the first inner fabric 12a and a cross section of one side of the second inner fabric 12b by ultrasonic welding by making the cross section of one side of the first inner fabric 12a be in contact with the cross section of one side of the second inner fabric 12b without overlapping. Herein, a contact portion 12c is ultrasonic welding processed. Accordingly, it is appreciated that the inner fabric 12 of the second structure 20 collectively refers to the fabric formed by forming the membrane and the adhesive layer on each of the inner fabrics 12a and 12b and ultrasonic-welding the membrane, the adhesive layer, and each of the inner fabrics 12a and 12b.

The ultrasonic welding process of the inner fabric 12 is not limited to the foregoing process, similar to the ultrasonic welding process of the first outer fabric 10a and the second outer fabric 10b of the first structure, an ultrasonic welded fabric may also be completed by overlapping the first inner fabric 12a and the second inner fabric 12b including the membrane 14 and the adhesive layer 16 each other, bonding the first inner fabric 12a and the second inner fabric 12b by performing generally well-known ultrasonic welding on a slightly inner side (about 2 to 3 mm, but is not limited thereto) of a cross section at one side along the cross section at one side by an ultrasonic welding device (not illustrated), simultaneously cutting protruding portions, and making a surface of the cut portion head in the down direction.

Further, the first structure 10 and the second structure 20 of the exemplary embodiment of the present invention may be named as a first package and a second package.

A material of the first inner fabric 12a and the second inner fabric 12b may be one or more of polyester, polyamide, polyvinylchloride, polyketone, polysulfone, polycarbonate, fluoropolymer, polyacrylate, polyurethane, co-polyetherester, polypropylene, and co-polyetheramide.

The membrane 14 is disposed on an upper surface of the inner fabric 12. The membrane 14 has a waterproof function.

The membrane 14 may include one or more of microporous polytetrafluoroethylene, nanoporous polytetrafluoroethylene, expanded PTFE, polyurethane, cross-linked polyurethane, polypropylene, and polyester.

The membrane 14 may include one or more of activated carbon particles, graphene, and carbon nanotube (CNT).

In the meantime, the membrane 14 may have resistive force to one or more of pathogenic microorganisms, blood borne pathogen, viruses, bacteria, liquid chemical agents, and gaseous chemical agents which permeate through the first structure 10.

The adhesive layer 16 is formed on the membrane 14. That is, the adhesive layer 16 may be formed between the membrane 14 and the first structure 10. The adhesive layer 16 may mean a layer onto which any one of a powder adhesive, a web adhesive, a micro dot adhesive, and a nano dot adhesive is applied.

In FIG. 2, the bonded portion (that is, 10*c*) in the first structure 10 and the bonded portion 12*c* in the inner fabric 12 may be disposed at different positions. A welding point is changed as described above, so that strength is enhanced and thus strength is improved compared to that of the existing outdoor clothing.

Figure 3:
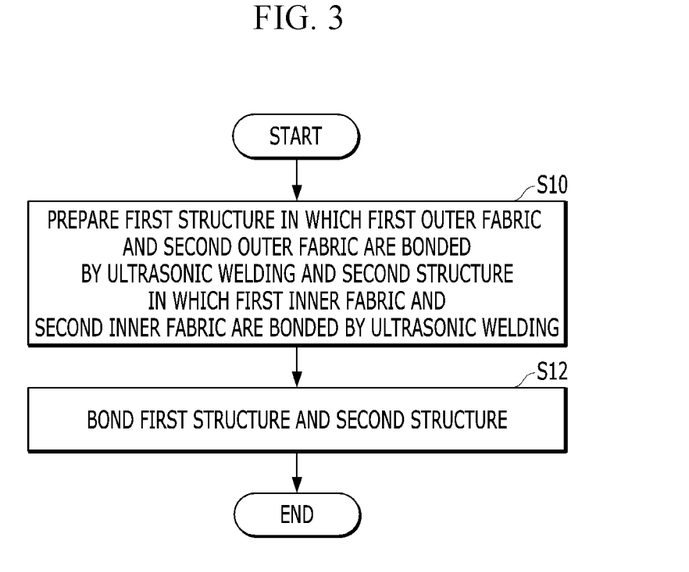
FIG. 3 is a flowchart for describing a method of manufacturing outdoor clothing requiring no seam tape and having an enhanced waterproof function according to the first exemplary embodiment of the present invention.

FIG. 3 is a flowchart for describing a method of manufacturing outdoor clothing requiring no seam tape and having an enhanced waterproof function according to the first exemplary embodiment of the present invention.

First, the first structure 10 in which the first outer fabric 10*a* and the second outer fabric 10*b* are bonded to each other by ultrasonic welding, and the second structure 20 including the inner fabric 12 in which the first inner fabric 12*a* and the second inner fabric 12*b* are bonded to each other by ultrasonic welding are prepared (S10). In this case, the first structure 10 may be manufactured by cutting the first outer fabric 10*a* according to a pattern of an item which is to be generated, cutting the second outer fabric 10*b* according to the pattern of the item which is to be generated, and then making a cross section of one side of the first outer fabric 10*a* be in contact with a cross section of one side of the second outer fabric 10*b* without overlapping, and bonding the contact portion 10*c* by ultrasonic welding (Further, the ultrasonic welding process is not limited to the foregoing process, and an ultrasonic welded fabric may also be completed by overlapping the first outer fabric 10*a* and the second outer fabric 10*b* each other, bonding the first outer fabric 10*a* and the second outer fabric 10*b* by performing generally well-known ultrasonic welding on a slightly inner side (about 2 to 3 mm, but is not limited thereto) of the cross section of one side along the cross section of one side by an ultrasonic welding device (not illustrated), simultaneously cutting protruding portions by a cutter, and then making a surface of the cut portion head in a down direction).

In the case where the inner fabric 12 of the second structure 20 is prepared, the membrane 14 is disposed on the upper surface of the first inner fabric 12*a* cut according to the pattern of the item which is to be generated, the adhesive layer 16 is formed on the upper surface of the membrane 14, the membrane 14 is disposed on the upper surface of the second inner fabric 12*b* cut according to the pattern of the item which is to be generated, the adhesive layer 16 is formed on the upper surface of the membrane 14, and then a cross section of one side of the first inner fabric 12*a* is made to be in contact with a cross section of one side of the second inner fabric 12*b* without overlapping to bond the first inner fabric 12*a* and the second inner fabric 12*b* by ultrasonic welding (the ultrasonic welding process is not limited to the foregoing process, and an ultrasonic welded fabric may also be completed by overlapping the first inner fabric 12*a* and the second inner fabric 12*b* including the membrane 14 and the adhesive layer 16 each other, bonding the first inner fabric 12*a* and the second inner fabric 12*b* by performing generally well-known ultrasonic welding on a slightly inner side (about 2 to 3 mm, but is not limited thereto) of the cross section of one side along the cross section of one side by an ultrasonic welding device (not illustrated) to integrally bond first inner fabric 12*a* and the second inner fabric 12*b* into one sheet of fabric through the ultrasonic contact surface when the bonded cross sections of the one side are spread, and then cutting portions protruding from the cross section of the one side by a cutter as a finishing operation, and then making a surface of the cut portion head in a down direction.

Herein, the second structure 20 does not mean only the inner fabric, but it is appreciated that the second structure 20 collectively refers to a structure in which the membrane and the adhesive layer are sequentially formed on the inner fabric.

Then, the first structure 10 is disposed on an upper surface of the second structure 20 in which the membrane 14 and the adhesive layer 16 are disposed, and then first structure 10 and the second structure 20 are bonded by applying pressure and heat by a hot pressing device (S12). More particularly, the first structure 10 may be disposed on the upper surface of the second structure 20, and the first structure 10 and the second structure 20 may be fused and then cold pressed. Herein, a fusing temperature of the first structure 10 and the second structure 20 is about 100 to 200° C. (preferably, 160 to 170° C.), a pressure is 0.1 to 1 megapascal (MPa) (preferably, 0.3 to 0.4 MPa), and a time is 10 seconds to 1 minute (preferably, 20 seconds). Further, a cold pressing temperature of the first structure 10 and the second structure 20 is room temperature, a pressure is 0.1 to 1 MPa (preferably, 0.3 to 0.4 MPa), and a time is 3 seconds to 10 seconds (preferably, 5 seconds). The cold pressing process is a hard-set process and a curing process.

In the meantime, although not illustrated in the drawing, the first structure 10 and the second structure 20 may be pre-fused by an iron at about 120° C. before the fusing process in a state where the first structure 10 is temporarily disposed on the second structure 20. In this case, the pre-fusing is a soft-set process and performs only a bonding function without curing.

The outdoor clothing manufactured by the first exemplary embodiment described above is thinner than the outdoor clothing in the related art, and has a waterproof effect.

Figure 4:
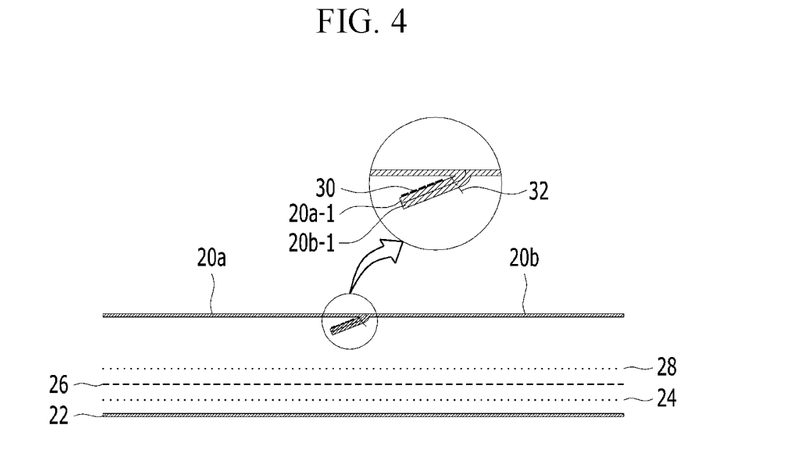
FIG. 4 is a diagram illustrating a state before a surface contact portion is bonded in a structure of outdoor clothing according to a second exemplary embodiment of the present invention.
Figure 5:
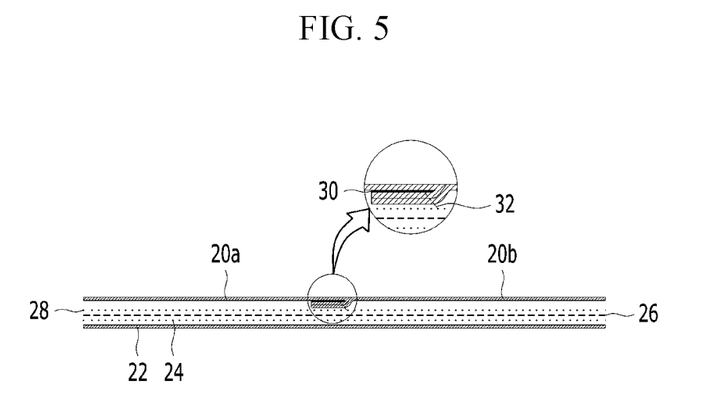
FIG. 5 is a diagram illustrating the structure of the outdoor clothing according to the second exemplary embodiment of the present invention.

FIG. 4 is a diagram illustrating a state before a surface contact portion is bonded in a structure of outdoor clothing according to a second exemplary embodiment of the present invention, and FIG. 5 is a diagram illustrating the structure of the outdoor clothing according to the second exemplary embodiment of the present invention.

Waterproof fabric according to the second exemplary embodiment of the present invention includes an outer fabric, an inner fabric 22, a first adhesive layer 24, a membrane 26, and a second adhesive layer 28.

A surface contact portion 20*a*-1 of a first outer fabric 20*a* is in surface-contact with a surface contact portion 20*b*-1 of a second outer fabric 20*b* to form the outer fabric.

Particularly, an adhesive 30, such as an adhesive tape or a bond, is positioned on an opposite surface corresponding to the surface contact portion 20*a*-1 of the first outer fabric 20*a* which is in surface contact with the surface contact portion 20*b*-1 of the second outer fabric 20*b*, and inner portions of the surface contact portion 20*a*-1 of the first outer fabric 20*a* and the surface contact portion 20*b*-1 of the second outer fabric 20*b* which are in surface-contact with each other are stitched. The stitched portion is indicated by reference numeral 32. Then, the surface contact portions 20*a*-1 and 20*b*-1 which face each other are folded toward the first outer fabric 20*a*, so that the outer fabric configured with the first outer fabric 20*a*-1 and the second outer fabric 20*b*-1 is finally completed.

A material of the first outer fabric 20a and the second outer fabric 20b may be one of polyester, polyamide, polyvinylchloride, polyketone, polysulfone, polycarbonate, fluoropolymer, polyacrylate, polyurethane, co-polyetherester, polypropylene, and co-polyetheramide.

The inner fabric 22 may be an inner fabric formed of the same material as that of the outer fabric (that is, the first outer fabric 20a and the second outer fabric 20b).

The first adhesive layer 24 is formed on an upper surface of the inner fabric 22.

The membrane 26 is disposed on an upper surface of the first adhesive layer 24. The membrane 26 has a waterproof function.

The membrane 26 may include one or more of microporous polytetrafluoroethylene, nanoporous polytetrafluoroethylene, expanded PTFE, polyurethane, cross-linked polyurethane, polypropylene, and polyester.

Further, the membrane 26 may include one or more of activated carbon particles, graphene, and carbon nanotube (CNT).

In the meantime, the membrane 26 may have resistive force to one of pathogenic microorganisms, blood borne pathogen, viruses, bacteria, liquid chemical agents, and gaseous chemical agents permeating through the outer fabric.

The second adhesive layer 28 is formed on an upper surface of the membrane 26.

Herein, the first adhesive layer 24 and the second adhesive layer 28 may mean layers onto which any one of a powder adhesive, a web adhesive, a micro dot adhesive, and a nano dot adhesive is applied.

In FIG. 4, the adhesive 30 is positioned on the opposite surface corresponding to the surface contact portion 20a-1 of the first outer fabric 20a which is in surface contact with the surface contact portion 20b-1 of the second outer fabric 20b, the inner portions of the surface contact portion 20a-1 of the first outer fabric 20a and the surface contact portion 20b-1 of the second outer fabric 20b which are in surface-contact with each other are stitched, and then the surface contact portions 20a-1 and 20b-1 which face each other are folded toward and attached to the first outer fabric 20a, so that the outer fabric configured with the first outer fabric 20a-1 and the second outer fabric 20b-1 is finally completed. Then, the second adhesive layer 28 is formed between the stitched outer fabric and the membrane 26. Accordingly, the adhesive 30 and the second adhesive layer 28 close holes of the outer fabric formed by the stitching, thereby preventing outside water from permeating through the outer fabric (see FIG. 5).

In FIGS. 4 and 5, the inner fabric 22, the first adhesive layer 24, the membrane 26, and the second adhesive layer 28 may be considered as one package (structure) 200.

Figure 6:
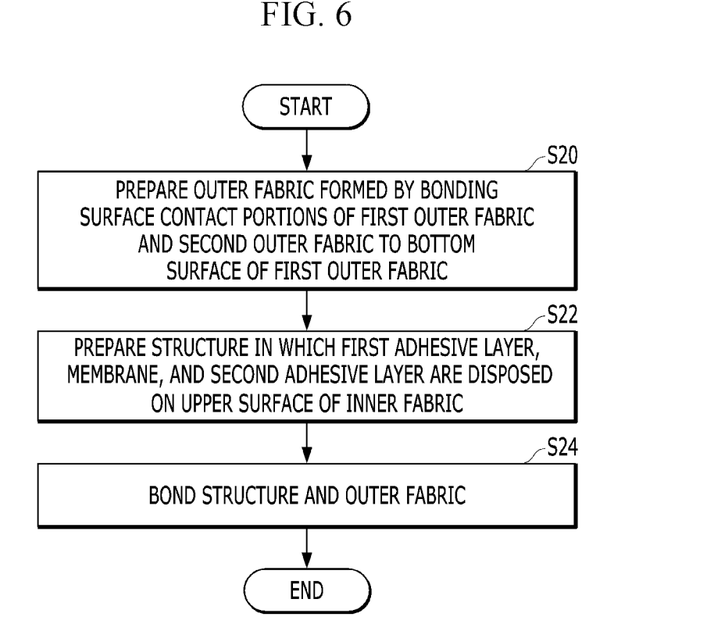
FIG. 6 is a flowchart for describing a method of manufacturing outdoor clothing requiring no seam tape and having an enhanced waterproof function according to the second exemplary embodiment of the present invention.

FIG. 6 is a flowchart for describing a method of manufacturing outdoor clothing requiring no seam tape and having an enhanced waterproof function according to the second exemplary embodiment of the present invention.

First, the outer fabric in which the surface contact portions 20a-1 and 20b-1 of the first outer fabric 20a and the second outer fabric 20b are bonded to a bottom surface of the first outer fabric is prepared (S20).

In this case, the first outer fabric 20a and the second outer fabric 20b are cut according to a pattern of an item which is to be generated.

The adhesive 30, such as an adhesive tape or a bond, is positioned on the opposite surface corresponding to the surface contact portion 20a-1 of the first outer fabric 20a which is in surface contact with the surface contact portion 20b-1 of the second outer fabric 20b, the inner end portions of the surface contact portion 20a-1 of the first outer fabric 20a and the surface contact portion 20b-1 of the second outer fabric 20b which are in surface-contact with each other are stitched (a stitching position 32), and the surface contact portions which face each other are folded and attached to the bottom surface of the first outer fabric 20a to complete the outer fabric.

Then, the structure (package) 200 in which the first adhesive layer 24 is formed on the upper surface of the inner fabric 22, the membrane 26 is disposed on the first adhesive layer 24, and the second adhesive layer 28 is formed on the upper surface of the membrane 26 is prepared (S22). In this case, one or more of the first adhesive layer 24 and the second adhesive layer 28 may be formed in the form of a micro dot. The membrane 26 having a waterproof function is disposed, so that even though outside water or moisture permeates through the outer fabric, it is possible to prevent outside water or moisture from further permeating.

Then, the outer fabric is disposed on the upper surface of the inner fabric 22 in which the membrane 26 and the first and second adhesive layers 24 and 28 are disposed, and then the inner fabric 22 and the outer fabric are bonded by applying pressure and heat by a hot pressing device (S24). More particularly, the outer fabric (the first outer fabric 20a and the second outer fabric 20b) may be disposed on the upper surface of the inner fabric 22, and the inner fabric 22 and the outer fabric may be fused and then cold pressed. Herein, a fusing temperature of the inner fabric 22 and the outer fabric is about 100 to 200° C. (preferably, 160 to 170° C.), a pressure is 0.1 to 1 MPa (preferably, 0.3 to 0.4 MPa), and a time is 10 seconds to 1 minute (preferably, 20 seconds). Further, a cold pressing temperature of the inner fabric 22 and the outer fabric is room temperature, a pressure is 0.1 to 1 MPa (preferably, 0.3 to 0.4 MPa), and a time is 3 seconds to 10 seconds (preferably, 5 seconds). The cold pressing process is a hard-set process and a curing process.

In the meantime, although not illustrated in the drawing, the inner fabric 22 and the outer fabric may be pre-fused by an iron at about 120° C. before the fusing process in a state where the outer fabric is temporarily disposed on the inner fabric 22. In this case, the pre-fusing is a soft-set process and performs only a bonding function without curing.

In the second exemplary embodiment, the adhesive 30 is positioned on the opposite surface corresponding to the surface contact portion 20a-1 of the first outer fabric 20a which is in surface contact with the surface contact portion 20b-1 of the second outer fabric 20b, the inner portions of the surface contact portion 20a-1 of the first outer fabric 20a and the surface contact portion 20b-1 of the second outer fabric 20b which are in surface-contact with each other are stitched, and then the surface contact portions 20a-1 and 20b-1 which face each other are folded toward and attached to the first outer fabric 20a, so that the outer fabric configured with the first outer fabric 20a-1 and the second outer fabric 20b-1 is finally completed. Then, the second adhesive layer 28 is formed between the stitched outer fabric and the membrane 26. Accordingly, the adhesive 30 and the second adhesive layer 28 close needle holes (not illustrated) of the outer fabric formed by the stitching, thereby preventing outside water from permeating through the outer fabric. Further, the membrane 26 having a waterproof function is disposed, so that even though outside water or moisture permeates through the outer fabric, it is possible to prevent outside water or moisture from further permeating.

In the second exemplary embodiment, the clothing may be considered to have a double waterproof function.

A product manufactured by the first exemplary embodiment or the second exemplary embodiment of the present invention described above may be one of an article of clothing, a portion of an article of clothing, a jacket, a coat, a parka, a raincoat, a cloak, a poncho, a shirt, a blouse, pants, shoes, boots, gloves, a hat, a hood, underwear, an undershirt, briefs, a bra, socks, a diaper, a protective suit for processing a dangerous substance, a protective suit for a fireman, a soldier, or a medical personnel, a blanket, a towel, a sheet, a pet bedding, a tent, a sleeping bag, a tarp, a boat cover, carpeting, a rug, a mat, a window cover, and an interior decoration good (upholstery).

In the foregoing, the optimum exemplary embodiments are disclosed in the drawing and the specification. In the present specification, the specific terms are used, but the specific terms are simply used for describing the present invention, and are not used for limiting the meaning or restricting the scope of the present invention described in the claims. Accordingly, those skilled in the art may appreciate that various modifications and other equivalent exemplary embodiments may be available from the exemplary embodiment of the present invention. Therefore, the true technical protection scope of the present invention shall be defined by the technical spirit of the accompanying claims.

INDUSTRIAL APPLICABILITY

The method of manufacturing outdoor clothing requiring no seam tape (seamless) and having an enhanced waterproof function according to the present invention is an improved method of manufacturing outdoor clothing which is applied to manufacturing clothes, a bag, shoes, a tent, and the like to improve a waterproof function, and according to the present invention having the foregoing configuration, even though water permeates, a bonded portion in the first structure and a bonded portion in the second structure are not positioned in the same vertical line, so that there is an effect in improving strength and the clothing is thinner than outdoor clothing in the related art.

A product manufactured by the present invention described above may be one of an article of clothing, a portion of an article of clothing, a jacket, a coat, a parka, a raincoat, a cloak, a poncho, a shirt, a blouse, pants, shoes, boots, gloves, a hat, a hood, underwear, an undershirt, briefs, a bra, socks, a diaper, a protective suit for processing a dangerous substance, a protective suit for a fireman, a soldier, or a medical personnel, a blanket, a towel, a sheet, a pet bedding, a tent, a sleeping bag, a tarp, a boat cover, carpeting, a rug, a mat, a window cover, and an interior decoration good (upholstery).

The invention claimed is:

1. A method of manufacturing outdoor clothing requiring no seam tape and having an enhanced waterproof function, the method comprising:
preparing a first structure in which a first outer fabric and a second outer fabric are bonded to each other by ultrasonic welding and a second structure in which a first inner fabric and a second inner fabric are bonded to each other by ultrasonic welding; and
bonding the first structure and the second structure,
wherein in the preparing,
a membrane is disposed on an upper surface of the first inner fabric and an adhesive layer is formed on an upper surface of the membrane,
a membrane is disposed on an upper surface of the second inner fabric and an adhesive layer is formed on an upper surface of the membrane, and then a cross section of one side of the first inner fabric is made to be in contact with a cross section of one side of the second inner fabric without overlapping and the first inner fabric and the second inner fabric are bonded by the ultrasonic welding to prepare the second structure, and
a bonded portion in the first structure and a bonded portion in the second structure are disposed at different positions.

2. The method of claim 1, wherein a material of the first outer fabric and the second outer fabric, and the first inner fabric and the second inner fabric is one or more of polyester, polyamide, polyvinylchloride, polyketone, polysulfone, polycarbonate, fluoropolymer, polyacrylate, polyurethane, and polypropylene.

3. The method of claim 1, wherein the membrane includes one or more of microporous polytetrafluoroethylene, nanoporous polytetrafluoroethylene, expanded PTFE, polyurethane, cross-linked polyurethane, polypropylene, and polyester.

4. The method of claim 1, wherein the membrane has resistive force to one or more of pathogenic microorganisms, blood borne pathogen, viruses, bacteria, liquid chemical agents, and gaseous chemical agents.

5. The method of claim 1, wherein the membrane includes one of activated carbon, graphene, and carbon nanotube (CNT).

6. The method of claim 1, wherein the adhesive layer, the first adhesive layer, and the second adhesive layer include one of activated carbon, graphene, and carbon nanotube (CNT).

7. The method of claim 1, wherein the bonding includes disposing the first structure on an upper surface of the second structure, fusing the first structure and the second structure, and then cold pressing the first structure and the second structure.

8. The method of claim 7, wherein the first structure and the second structure are pre-fused in a state where the first structure is temporarily disposed on the second structure before the fusing.

9. A product manufactured by the method of claim 1, wherein the product is one of an article of clothing, a portion of an article of clothing, a jacket, a coat, a parka, a raincoat, a cloak, a poncho, a shirt, a blouse, pants, shoes, boots, gloves, a hat, a hood, underwear, an undershirt, briefs, a bra, socks, a diaper, a protective suit for processing a dangerous substance, a protective suit for a fireman, a soldier, or a medical personnel, a blanket, a towel, a sheet, a pet bedding, a tent, a sleeping bag, a tarp, a boat cover, carpeting, a rug, a mat, a window cover, and an interior decoration good (upholstery).

10. A method of manufacturing outdoor clothing requiring no seam tape and having an enhanced waterproof function, the method comprising:
preparing an outer fabric in which surface contact portions of a first outer fabric and a second outer fabric are bonded to a bottom surface of the first outer fabric;
preparing a structure in which a first adhesive layer, a membrane, and a second adhesive layer are sequentially disposed on an upper surface of an inner fabric; and
bonding the structure and the outer fabric,
wherein in the preparing of the outer fabric, an adhesive is positioned on an opposite surface corresponding to the surface contact portion of the first outer fabric which is in surface contact with the surface contact portion of the second outer fabric, ends of the inner sides of the surface contact portion of the first outer fabric and the surface contact portion of the second outer fabric which are in surface contact with each other are stitched, and the surface contact portions which face each other are folded and attached to a bottom surface of the first outer fabric.

11. The method of claim 10, wherein a material of the first outer fabric and the second outer fabric, and the first inner fabric and the second inner fabric is one or more of polyester, polyamide, polyvinylchloride, polyketone, polysulfone, polycarbonate, fluoropolymer, polyacrylate, polyurethane, and polypropylene.

12. The method of claim 10, wherein the membrane includes one or more of microporous polytetrafluoroethylene, nanoporous polytetrafluoroethylene, expanded PTFE, polyurethane, cross-linked polyurethane, polypropylene, and polyester.

13. The method of claim 10, wherein the membrane has resistive force to one or more of pathogenic microorganisms, blood borne pathogen, viruses, bacteria, liquid chemical agents, and gaseous chemical agents.

14. The method of claim 10, wherein the membrane includes one of activated carbon, graphene, and carbon nanotube (CNT).

15. The method of claim 10, wherein the adhesive layer, the first adhesive layer, and the second adhesive layer include one of activated carbon, graphene, and carbon nanotube (CNT).

16. A product manufactured by the method of claim 10, wherein the product is one of an article of clothing, a portion of an article of clothing, a jacket, a coat, a parka, a raincoat, a cloak, a poncho, a shirt, a blouse, pants, shoes, boots, gloves, a hat, a hood, underwear, an undershirt, briefs, a bra, socks, a diaper, a protective suit for processing a dangerous substance, a protective suit for a fireman, a soldier, or a medical personnel, a blanket, a towel, a sheet, a pet bedding, a tent, a sleeping bag, a tarp, a boat cover, carpeting, a rug, a mat, a window cover, and an interior decoration good (upholstery).

\* \* \* \* \*